Aug. 18, 1964 A. BRUNNER 3,144,856
STEAM GENERATING PLANT
Filed Nov. 10, 1960
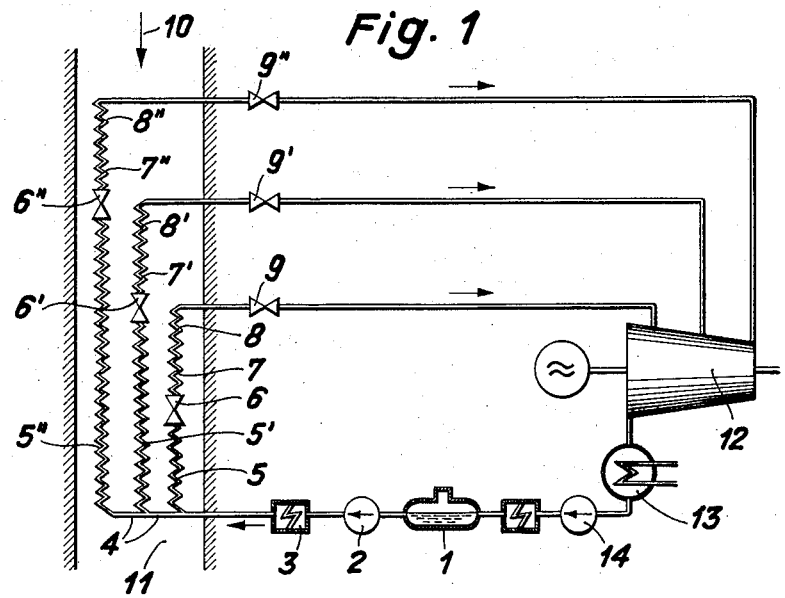
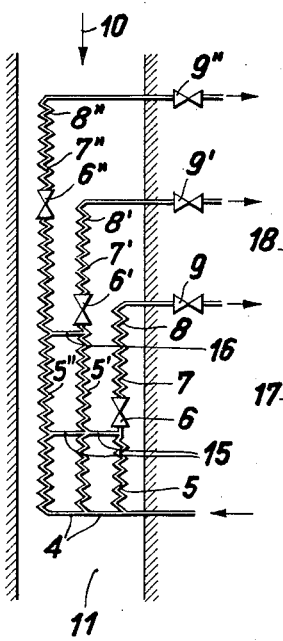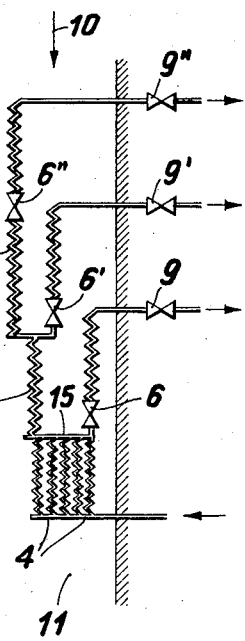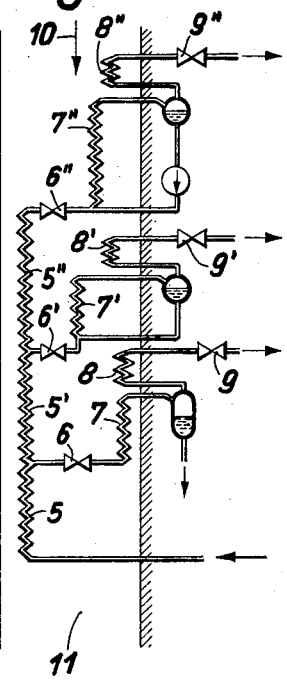

United States Patent Office

3,144,856
Patented Aug. 18, 1964

3,144,856
STEAM GENERATING PLANT
Alfred Brunner, Winterthur, Switzerland, assignor to Sulzer Freres, S.A., Winterthur, Switzerland, a corporation of Switzerland
Filed Nov. 10, 1960, Ser. No. 68,447
Claims priority, application Switzerland Nov. 26, 1959
5 Claims. (Cl. 122—406)

The present invention relates to a steam generating plant comprising a plurality of steam generators producing steam of different pressures and temperatures and being fed in parallel relation with feedwater from a common source supplying the feedwater at a pressure which is higher than the operating pressure of the steam generator producing the highest pressure steam. The steam generators are heated by a hot heating fluid flowing consecutively through the steam generators. The plant according to the invention is particularly suitable for utilizing the heat produced in a nuclear reactor which heat is conveyed by the heating fluid from the reactor to the steam generators.

In the plant according to the invention the feedwater is preheated by the same hot heating fluid which heats the steam generators, before the feedwater enters the steam generators. A common feedwater heater is provided for all steam generators and the pressure of the preheated feedwater is reduced to the operating pressure of the individual steam generators at the inlet of the steam generators.

Since the pressure in the entire feedwater heater is higher than the operating pressure of the steam generator producing the highest pressure steam, the temperature of the feedwater may be raised anywhere in the feedwater heater to almost the temperature of saturated steam of said pressure without formation of steam in the feedwater heater and the feedwater heater portions can be arranged in the passage of the heating fluid and relatively to the steam generators in a manner which facilitates construction, does not interfere with an optimal arrangement of the steam generators, and best suits heat transfer and thermodynamic considerations. The feedwater heater portions connected to the individual steam generators may be arranged in series or in parallel relation, or a combination thereof. If arranged in parallel relation, the feedwater heater portions serving the individual steam generators may be interconnected by equalizing conduits for feedwater communication between the connected portions. These connections can be at such locations where they produce an optimum effect.

The novel features which are considered characteristic of the invention are set forth with particularity in the appended claims. The invention itself, however, and additional objects and advantages thereof will best be understood from the following description of embodiments thereof when read in connection with the accompanying drawing, wherein:

FIG. 1 is a diagrammatic illustration of a plant according to the invention.

FIG. 2 is a diagrammatic illustration of a modified steam generating plant according to the invention.

FIG. 3 is a diagrammatic illustration of a further modification of a plant according to the invention.

FIG. 4 is a diagrammatic illustration of another modification of a plant according to the invention.

In the examples diagrammatically shown in FIGS. 1 to 4, the operating medium to be vaporized is assumed to be water and the heating fluid is assumed to be $CO_2$. The present invention is not limited to these particular substances.

Referring more particularly to the drawing, numeral 11 designates a duct or flue through which a gaseous heating medium flows in the direction indicated by an arrow 10. The heating medium may have been heated, for example, in a nuclear reactor, not shown.

Feedwater is supplied to the steam generator of the plant shown in FIG. 1 by means of a feed pump 2 which receives cold water from a tank 1 and raises its pressure to the highest pressure occurring in the plant. The water passes first through a pre-heater 3 and thereupon through a header 4 which distributes the water into three preheater portions 5, 5' and 5" which are located in the duct 11 and heated by hot gas. The preheaters 5, 5' and 5" individually form part of three steam generators 7, 7' and 7", respectively. The generator 7 is in the relatively coldest zone of the duct 11 and operates at the relatively lowest pressure. The generator 7' is exposed to a hotter gas and operates at a higher pressure than the generator 7. The steam generator 7" is in the relatively hottest zone of the duct 11 and is operated at the relatively highest pressure. Throttle valves 6, 6' and 6" are interposed between the preheaters 5, 5', 5" and steam generators 7, 7', 7", respectively, in order to reduce the high pressure prevailing in the preheaters to the pressures at which the individual steam generators are operated.

Steam superheaters 8, 8' and 8" are connected in series relation to the steam generators 7, 7' and 7", respectively. The superheated steam is conducted from the superheaters 8, 8' and 8" through valves 9, 9' and 9", respectively, to three different pressure stages of a steam turbine 12. The latter exhausts into a condenser 13 wherefrom the condensate is returned by a pump 14 to the storage tank 1.

In the modification shown in FIG. 2 the preheaters 5, 5' and 5" are interconnected by a pipe 15 and the preheaters 5' and 5" are connected once more by a pipe 16 for equalizing the pressure in the preheaters and providing communication between the preheaters. Even when the steam generators 7, 7' and 7" are under unequal loads, owing to the connecting pipe the feedwater flow is distributed equally between the parts of the preheaters 5, 5' and 5" situated before this pipe, so that their heating surfaces are exploited better and the efficiency of the system is raised.

In the embodiment of the invention shown in FIG. 3 the high pressure preheater comprises a first section including a number of tubes arranged in parallel relation with respect to the flow of water therethrough which number may be greater than the number of steam generators supplied by the preheater. The effluents of these tubes are collected in a collector 15'. Preheated feedwater is tapped from the collector 15' and conducted through a throttle valve 6 to the low pressure steam generator 7. The balance of the preheated feedwater in the collector 15' flows through a second preheater 17 which supplies preheated water to a medium pressure steam generator 7' through a throttle valve 6'. The water preheated in the preheater 17 and not flowing into the steam generator 7' is conducted through a third preheater 18 and therefrom through a throttle valve 6" into a high pressure steam generator 7".

FIG. 4 shows that use of the invention is not limited to a particular kind of steam generator. In the embodiment of the invention shown in FIG. 4 feedwater preheated in a first preheater section 5 flows through a throttle valve 6 into a forced flow steam generator including an evaporating portion 7 and a superheating portion 8. Feedwater further preheated in a second preheater section 5' flows through a throttle valve 6' into a natural circulation boiler having an evaporating section 7' and a superheating section 8'. The highly heated water emerging from a third preheater section 5" flows through a throttle valve 6" into a forced circulation steam generator which includes an evaporating part 7" and a superheater 8″. In the modification shown in FIG. 4 the three preheater sections 5, 5′ and 5″ are arranged in series relation so that the preheater section 5 receives the entire high pressure water required for feeding three steam generators and the second preheater section 5′ preheats the water required by the medium pressure and by the high pressure steam generator.

I claim:

1. A steam generating plant comprising duct means, a hot heating fluid flowing through said duct means, a plurality of steam generators producing steam at different pressures and placed in said duct means in series relation with respect to the flow of the heating fluid for heating by the latter, a source of supply of feedwater at a pressure exceeding the operating pressure of the steam generator which produces the highest pressure steam, a tubular feedwater heater connected to said source for receiving high pressure feedwater therefrom, said feedwater heater having a plurality of portions placed in said duct means to receive different amounts of heat from said heating fluid, each of said steam generators having an inlet connected to a different one of said portions of said feedwater heater for receiving feedwater at different temperatures therefrom, and a throttling means interposed in each of said inlets for maintaining an equal pressure in all of said feedwater heater portions and for individually reducing the pressure of the feedwater leaving said feedwater heater portions to the operating pressure of the respective steam generator.

2. A steam generating plant as defined in claim 1 wherein said feedwater heater portions have different sizes and are arranged in parallel relation with respect to the flow of the feedwater therethrough.

3. A steam generating plant according to claim 1 including equalizing pipes interconnecting at least two of said portions for feedwater communication between and pressure equalization in the connected portions.

4. A steam generating plant according to claim 1 wherein at least one of said portions comprises a plurality of tubes connected in parallel relation with respect to the feedwater flow.

5. A steam generating plant comprising duct means, a hot heating fluid flowing through said duct means, a plurality of steam generators producing steam at different pressures and placed in said duct means in series relation with respect to the flow of the heating fluid for heating by the latter, a source of supply of feedwater at a pressure exceeding the operating pressure of the steam generator which produces the highest pressure steam, a tubular feedwater heater connected to said source for receiving high pressure feedwater therefrom, said feedwater heater having a plurality of portions placed in said duct means to be heated by said heating fluid and connected in series relation with respect to the flow of the feedwater therethrough, said steam generators individually having an inlet connected to a different one of said portions of said feedwater heater for receiving feedwater at different temperatures therefrom, and a throttling means interposed in each of said inlets for maintaining an equal pressure in all of said feedwater heater portions and for individually reducing the pressure of the feedwater leaving said feedwater heater portions to the operating pressure of the respective steam generator.

References Cited in the file of this patent

UNITED STATES PATENTS

| 1,860,364 | LaMont | May 31, 1932 |
|---|---|---|
| 2,842,103 | Profos | July 8, 1958 |
| 2,952,602 | Wootton | Sept. 13, 1960 |